US009014619B2

(12) United States Patent
Benjamin et al.

(10) Patent No.: US 9,014,619 B2
(45) Date of Patent: Apr. 21, 2015

(54) METHODS AND SYSTEMS FOR SATELLITE COMMUNICATIONS EMPLOYING GROUND-BASED BEAM FORMING WITH SPATIALLY DISTRIBUTED HYBRID MATRIX AMPLIFIERS

(75) Inventors: Ted Benjamin, Oakton, VA (US);
Matthew Griffin, Purcellville, VA (US);
William W. Chapman, Great Falls, VA (US)

(73) Assignee: ATC Technologies, LLC, Reston, VA (US)

( * ) Notice: Subject to any disclaimer, the term of this patent is extended or adjusted under 35 U.S.C. 154(b) by 2295 days.

(21) Appl. No.: 11/751,701

(22) Filed: May 22, 2007

(65) Prior Publication Data

US 2007/0281612 A1   Dec. 6, 2007

Related U.S. Application Data

(60) Provisional application No. 60/803,448, filed on May 30, 2006.

(51) Int. Cl.
*H04B 7/15* (2006.01)
*H04B 7/185* (2006.01)
(Continued)

(52) U.S. Cl.
CPC .......... *H04B 7/18515* (2013.01); *H04B 7/2041* (2013.01)

(58) Field of Classification Search
CPC ............... H04B 7/185; H04B 7/18515; H04B 7/18504; H04B 7/18539; H04B 7/204; H04B 7/2041; H04B 7/0617; H01Q 3/2658; H01Q 3/26; H01Q 3/40; H01Q 25/007; H03F 3/602; G01S 7/40; G01S 7/4008; G01S 7/4017; G01S 13/765; G01S 13/878
USPC ........... 455/12.1, 3.04, 3.05, 13.1, 13.3, 13.4, 455/427, 13.2, 63.1, 456.1, 11.1, 15, 39, 455/63.4, 67.15, 67.16, 73, 101, 102, 121, 455/1, 29, 269, 273, 277.1, 424, 436, 446, 455/447, 450, 456.2, 458, 507, 517, 522, 455/525, 553.1, 561, 562.1, 575.7; 333/2, 333/124 D, 124 R, 117, 149, 295; 342/352, 342/373, 442, 70, 140, 157, 158, 202, 354, 342/356, 368, 371, 372, 159, 161, 367, 374, 342/375, 377, 378, 4, 24; 370/18, 104, 315, 370/316, 325, 326, 328, 319, 480, 535, 334, 370/343, 203, 252, 278, 280, 312, 321, 329, 370/335, 336, 337, 338, 345, 411; 375/1, 375/267, 140, 144, 148, 232, 262, 292, 296, 375/298, 299, 346, 354; 330/2, 124 D, 330/124 R, 117, 149, 286, 295; 275/1, 267, 275/316; 343/700 MS, 705, 711, 754, 755, 343/756, 757, 770, 771, 775, 781 CA, 78, 6, 343/792.5, 836, 844, 853, 876, 893

See application file for complete search history.

(56) References Cited

U.S. PATENT DOCUMENTS

| 4,901,085 | A | 2/1990 | Spring et al. |
| 4,901,307 | A | 2/1990 | Gilhousen et al. |

(Continued)

FOREIGN PATENT DOCUMENTS

| EP | 0 506 255 A2 | 9/1992 |
| EP | 0 506 255 A3 | 9/1992 |

(Continued)

OTHER PUBLICATIONS

International Search Report, PCT/US2007/012297, Dec. 12, 2007.

(Continued)

*Primary Examiner* — Yuwen Pan
*Assistant Examiner* — Paul P Tran
(74) *Attorney, Agent, or Firm* — Myers Bigel Sibley & Sajovec, P.A.

(57) ABSTRACT

A satellite communications system includes a satellite configured to communicate with terminals, a station configured to communicate signals intended for the terminals to the satellite via a plurality of feeder links and a beamformer including an input multi-port hybrid matrix (MPHM) and a complementary output MPHM in a signal path with the plurality of feeder links. The output MPHM is positioned at the satellite and coupled to the input MPHM via the plurality of feeder links. For example, the input MPHM may be positioned at a ground-based satellite gateway. The input and output MPHMs may be configured to implement fully populated signal transformation matrices that collectively provide a substantially diagonal signal transformation matrix.

30 Claims, 12 Drawing Sheets

(51) Int. Cl.
  *G01S 13/00* (2006.01)
  *H01Q 3/00* (2006.01)
  *H01Q 3/22* (2006.01)
  *H01Q 19/06* (2006.01)
  *H01Q 21/00* (2006.01)
  *H03F 3/68* (2006.01)
  *H04B 7/204* (2006.01)

(56) References Cited

U.S. PATENT DOCUMENTS

| | | | |
|---|---|---|---|
| 5,055,798 A * | 10/1991 | Heinzelmann | 330/295 |
| 5,073,900 A | 12/1991 | Mallinckrodt | |
| 5,115,248 A * | 5/1992 | Roederer | 342/373 |
| 5,303,286 A | 4/1994 | Wiedeman | |
| 5,339,330 A | 8/1994 | Mallinckrodt | |
| 5,363,109 A * | 11/1994 | Hofgen et al. | 342/31 |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |
| 5,612,703 A | 3/1997 | Mallinckrodt | |
| 5,619,525 A | 4/1997 | Wiedeman et al. | |
| 5,631,898 A | 5/1997 | Dent | |
| 5,761,605 A | 6/1998 | Tawil et al. | |
| 5,765,098 A | 6/1998 | Bella | |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A | 11/1999 | Mallinckrodt | |
| 6,011,951 A | 1/2000 | King et al. | |
| 6,016,124 A * | 1/2000 | Lo et al. | 342/373 |
| 6,023,605 A | 2/2000 | Sasaki et al. | |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,072 B1 * | 5/2001 | Lo et al. | 370/316 |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,317,420 B1 * | 11/2001 | Schiff | 370/325 |
| 6,324,405 B1 | 11/2001 | Young et al. | |
| 6,339,707 B1 | 1/2002 | Wainfan et al. | |
| 6,418,147 B1 | 7/2002 | Wiedeman | |
| 6,449,461 B1 | 9/2002 | Otten | |
| 6,522,865 B1 | 2/2003 | Otten | |
| 6,628,919 B1 | 9/2003 | Curello et al. | |
| 6,684,057 B2 | 1/2004 | Karabinis | |
| 6,735,437 B2 | 5/2004 | Mayfield et al. | |
| 6,775,251 B1 | 8/2004 | Wiedeman et al. | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,914,557 B2 * | 7/2005 | Chang et al. | 342/354 |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| 7,031,702 B2 | 4/2006 | Karabinis et al. | |
| 7,039,400 B2 | 5/2006 | Karabinis et al. | |
| 7,062,267 B2 | 6/2006 | Karabinis | |
| 7,092,708 B2 | 8/2006 | Karabinis | |
| 7,113,743 B2 | 9/2006 | Karabinis | |
| 7,113,778 B2 | 9/2006 | Karabinis | |
| 7,174,127 B2 | 2/2007 | Otten et al. | |
| 7,181,161 B2 | 2/2007 | Karabinis | |
| 7,203,490 B2 | 4/2007 | Karabinis | |
| 7,218,931 B2 | 5/2007 | Karabinis | |
| 7,305,211 B2 * | 12/2007 | Dent | 455/12.1 |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0149986 A1 | 8/2003 | Mayfield et al. | |
| 2003/0153308 A1 | 8/2003 | Karabinis | |
| 2004/0072539 A1 | 4/2004 | Monte et al. | |
| 2004/0102156 A1 | 5/2004 | Loner | |
| 2004/0110467 A1 * | 6/2004 | Wang | 455/12.1 |
| 2004/0121727 A1 | 6/2004 | Karabinis | |
| 2004/0142660 A1 | 7/2004 | Churan | |
| 2004/0192200 A1 | 9/2004 | Karabinis | |
| 2004/0192395 A1 | 9/2004 | Karabinis | |
| 2004/0203393 A1 | 10/2004 | Chen | |
| 2004/0240525 A1 | 12/2004 | Karabinis et al. | |
| 2005/0026606 A1 | 2/2005 | Karabinis | |
| 2005/0037749 A1 | 2/2005 | Karabinis et al. | |
| 2005/0041619 A1 | 2/2005 | Karabinis et al. | |
| 2005/0079816 A1 | 4/2005 | Singh et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0170834 A1 | 8/2005 | Dutta et al. | |
| 2005/0181786 A1 | 8/2005 | Karabinis et al. | |
| 2005/0201449 A1 | 9/2005 | Churan | |
| 2005/0208890 A1 | 9/2005 | Karabinis | |
| 2005/0221757 A1 | 10/2005 | Karabinis | |
| 2005/0227618 A1 | 10/2005 | Karabinis et al. | |
| 2005/0239399 A1 | 10/2005 | Karabinis | |
| 2005/0239403 A1 | 10/2005 | Karabinis | |
| 2005/0239404 A1 | 10/2005 | Karabinis | |
| 2005/0239457 A1 | 10/2005 | Levin et al. | |
| 2005/0245192 A1 | 11/2005 | Karabinis | |
| 2005/0260947 A1 | 11/2005 | Karabinis et al. | |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0282542 A1 | 12/2005 | Karabinis | |
| 2005/0288011 A1 | 12/2005 | Dutta | |
| 2006/0040613 A1 | 2/2006 | Karabinis et al. | |
| 2006/0040657 A1 | 2/2006 | Karabinis et al. | |
| 2006/0040659 A1 | 2/2006 | Karabinis | |
| 2006/0094352 A1 | 5/2006 | Karabinis | |
| 2006/0094420 A1 | 5/2006 | Karabinis | |
| 2006/0105707 A1 | 5/2006 | Karabinis | |
| 2006/0111041 A1 | 5/2006 | Karabinis | |
| 2006/0111056 A1 | 5/2006 | Dutta | |
| 2006/0135058 A1 | 6/2006 | Karabinis | |
| 2006/0135060 A1 | 6/2006 | Karabinis | |
| 2006/0135070 A1 | 6/2006 | Karabinis | |
| 2006/0165120 A1 | 7/2006 | Karabinis | |
| 2006/0189274 A1 | 8/2006 | Karabinis | |
| 2006/0189275 A1 | 8/2006 | Karabinis | |
| 2006/0189309 A1 | 8/2006 | Good et al. | |
| 2006/0194576 A1 | 8/2006 | Karabinis et al. | |

(56) References Cited

U.S. PATENT DOCUMENTS

| | | |
|---|---|---|
| 2006/0205346 A1 | 9/2006 | Evans et al. |
| 2006/0205347 A1* | 9/2006 | Karabinis .................. 455/12.1 |
| 2006/0205367 A1 | 9/2006 | Karabinis |
| 2006/0211371 A1 | 9/2006 | Karabinis et al. |
| 2006/0211419 A1 | 9/2006 | Karabinis |
| 2006/0211452 A1 | 9/2006 | Karabinis |
| 2006/0217070 A1 | 9/2006 | Karabinis |
| 2006/0232465 A1 | 10/2006 | Levin et al. |
| 2006/0233147 A1 | 10/2006 | Karabinis |
| 2006/0246838 A1 | 11/2006 | Karabinis |
| 2006/0252368 A1 | 11/2006 | Karabinis |
| 2006/0276129 A1 | 12/2006 | Karabinis |
| 2006/0292990 A1 | 12/2006 | Karabinis et al. |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0026867 A1 | 2/2007 | Karabinis |
| 2007/0037514 A1 | 2/2007 | Karabinis |
| 2007/0072545 A1 | 3/2007 | Karabinis et al. |
| 2007/0087690 A1* | 4/2007 | Karabinis .................. 455/12.1 |
| 2007/0099562 A1 | 5/2007 | Karabinis et al. |
| 2007/0184849 A1* | 8/2007 | Zheng ...................... 455/456.1 |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 303 927 B1 | 5/2005 |
| EP | 1303927 B1 * | 5/2005 |
| WO | WO 01/54314 A1 | 7/2001 |
| WO | WO2007/012297 A2 | 10/2007 |

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, vol. 4, 1998, pp. 189-198.

* cited by examiner

METHODS AND SYSTEMS FOR SATELLITE COMMUNICATIONS EMPLOYING GROUND-BASED BEAM FORMING WITH SPATIALLY DISTRIBUTED HYBRID MATRIX AMPLIFIERS

RELATED APPLICATION

The present application claims the benefit of U.S. Provisional Patent Application Ser. No. 60/803,448, filed May 30, 2006 and incorporated herein by reference in its entirety as if the text thereof were physically present.

FIELD OF THE INVENTION

This invention relates to wireless communications systems and methods. More specifically, this invention relates to satellite communications systems that employ phased array antennas to produce multiple space-to-earth antenna beams.

BACKGROUND OF THE INVENTION

Satellite communications systems, employing at least one or more satellites, are widely used to provide both fixed wireless and mobile wireless communication services to a geographically dispersed population of end-user terminals/handsets.

A satellite communications system may utilize a single satellite antenna beam (herein referred to as antenna patterns, spot beams, or more simply beams or cells) covering the entire area served by the satellite communication system. Alternatively, satellite communications systems may employ multiple satellite beams, each of which provides service to distinct geographical areas contained within an overall service region, to collectively serve a larger overall satellite footprint. The satellite typically communicates with terminals or handsets over a bidirectional communications link, with communications signals being communicated from the satellite to a terminal/handset over a downlink or forward service link, and from the terminal/handset to the satellite over an uplink or return service link. The overall design and operation of satellite communication systems and methods are well known to those having skill in the art, and need not be described further herein.

Satellite communication systems and methods may deploy tens or hundreds of antenna beams or service cells, each of which corresponds to one or more spot beams, over a satellite footprint corresponding to the satellite service area. Large numbers of beams/cells may be generally desirable, since the frequency reuse and the resulting system capacity of a satellite communications system may increase in direct proportion to the total number of beams/cells employed. Moreover, for a given satellite footprint or service area, increasing the number of antenna beams may also provide a higher antenna gain per cell, which in turn can increase the link robustness and improve the quality of service.

The ensemble of forward beams/cells may be spatially congruent, substantially congruent, or substantially incongruent with the set of return-link beams. The entire satellite footprint, or substantially the entire satellite footprint, or a part of the satellite footprint may be covered by the set of forward and/or return-link beams. The locations and contours of the forward and/or return-link beams may be a priori determined and fixed, or may be reconfigurable relative to a given geographic location in response to a measurement and/or set of measurements. In support of these measurements the satellite forward and/or return links may be configured to transmit and/or receive at least one calibration signal upon which one or specific calibration measurements may be performed. In the case of the forward-link beams, the measurements may be made by equipment located on the satellite, or by calibration terminals/equipment located on the ground at known geographic locations. In the case of the return links, the necessary calibration signals may be generated by terminals and/or equipment located on the ground, and the measurements may be performed by either the satellite or satellite gateway. These forward and return link measurements are generally referred to as the beamforming calibration process, and are used to initialize and/or update and refine the performance of the satellite forward and/or return link beams, and are considered to be an integral part of the overall beamforming process.

The generation of a large number of forward link service beams is frequently enabled by the use of a phased array antenna onboard the satellite. Such phased array antennas typically utilize multiple, simultaneously radiating antenna elements driven by signals that are individually weighted in both phase and amplitude in order to properly point and shape the resulting beam set. The design of the phased array antenna may be either direct radiating or indirect-radiating. In a typical direct radiating phased array antenna, the radiating elements directly illuminate the service area or earth. In typical indirect phased array, an intermediate reflecting aperture is used to focus and/or shape the patterns of the radiating elements.

In order to provide adequate signal levels on forward link service beams, each of the individual input signals applied to the phased array elements on the satellite typically may be suitably pre-amplified prior to insertion onto the phased array antenna elements. In order to equalize the signal input levels applied to the individual transmit amplifiers, and therefore maintain the amplifiers within their proper signal level range, Hybrid Matrix Amplifier (HMA) configurations are commonly used onboard communication satellites.

A typical Hybrid Matrix Amplifier is comprised of a set of N ($N=2^n$, where n is an integer) parallel amplifiers located symmetrically between two, cascaded N-input by N-output multi-port hybrid matrix (MPHM) devices. In a typical HMA arrangement, N individual amplifier input signals are supplied by the N outputs of the N×N Input MPHM, and the N amplifier output signals are similarly applied to the input section of the N×N Output MPHM.

Typical Multi-Port Hybrid Matrix devices use specific arrangements of interconnected hybrid couplers to combine N input signals to produce N output signals, where the resultant outputs signals are linear combinations of the N input signals. The amplitude and phase (or time delay) weightings that are internally applied by the MPHM to the input signals in order to create the N output signals are typically functions of the MPHM's specific design. Owing to the nature of the signal transformation performed by the HMA, the intermediate N signals located at the input (and output) of the parallel amplifiers are usually substantially identical in amplitude. This equalization of amplitude/drive levels across a group of intermediate power amplifiers is one reason for incorporating HMAs on board communication satellites. In a typical satellite beamforming application, both the Input MPHM and the Output MPHM are co-located on the satellite.

The above description has focused on communications between the communication satellite and the wireless terminals/handsets. However, fixed and mobile satellite communications systems also commonly generally employ a bidirectional feeder link (or links) for communications between a satellite gateway, or gateways (located on the earth) and the satellite. A typical bidirectional feeder link includes a forward feeder link from the gateway to the satellite and a return feeder link from the satellite to the gateway. The forward feeder link and the return feeder link may each use one or more feeder link carriers and/or channels located within the feeder links assigned band of frequencies.

FIG. 1 provides a system level overview of a satellite communication system that incorporates traditional satellite-based beamforming, and depicts interconnectivity. The components include a satellite 10, one or more satellite earth station(s) or gateways 20 (including feeder link antennas), and end-user terminals or handsets 30. In this system design, the signals for each individual beam 15 are commonly multiplexed directly onto the feeder link uplink. The satellite 10 may perform feeder link de-multiplexing of signals received at one or more feeder link antennas 11, and beamformer processing to properly amplitude and phase weight the individual phased-array element signals prior to applying the resulting amplitude/phased weighted signals to the phased array antenna elements 12 for the forward and return link beams 15.

FIG. 2 provides a high-level system level overview of a conventional satellite for a system that uses ground-based beamforming (GBBF), and depicts the interconnectivity between the functional beamforming components located within the satellite earth station or gateway. System components may include one or more calibration stations 40, a satellite 10, and one or more satellite earth stations (gateways) 20. These gateways 20 may include one or more feeder link antennas 22, and the Ground Based Beamforming (GBBF) signal processing hardware 24. In this GBBF implementation, the individual signals that are to be radiated by the phased array antenna elements may be pre-weighted on the ground in amplitude and/or phase, and antenna element signals may be multiplexed directly onto the feeder link uplink. In this approach, the individual signals that are multiplexed onto the feeder link uplink may contain constituent or component signals from many, or possibly all, of the final user beams.

FIG. 3 depicts typical conventional GBBF gateway processing for a satellite system that employs GBBF. In this scenario, the user data associated with each beam typically is externally supplied to a GBBF sub-system 50 by additional subsystems located within the satellite gateway. The GBFF sub-system 50 includes a signal replication and forward beamforming weighting unit 52, and element combiner 54, a calibration signal generator 54 and a forward GBBF (F-GBBF) controller 58. Assuming that there are $N_B$ beams and $N_E$ phased array elements, as many as $N_B \times N_E$ individual signals may be subjected to amplitude and phase adjustment within the GBBF subsystem 50. The GBBF subsystem 50 processes injected calibration signals to derive element specific amplitude and phase corrections, which are applied individually to each of the $N_B \times N_E$ component element signals. At the output of the element combiner 56, each set of $N_B$ elemental signals associated with a particular phased array antenna element are summed and the resulting $N_E$ composite signals are then multiplexed onto the forward feeder link by a forward link multiplexer 60.

FIG. 4 depicts one possible implementation of satellite payload processing for a conventional system that employs GBBF. In this implementation, $N_E$ individual element signals are multiplexed onto the forward feeder link by the satellite gateway, and a satellite payload 70 in turn performs the necessary signal de-multiplexing. The resulting element signals are then individually amplified by the satellite payload 70. In this implementation, each element signal is individually amplified by a single dedicated amplifier. The resulting amplified signals are then applied to the appropriate phased array element from the set of $N_E$ elements of an antenna feed array 80.

FIG. 5 depicts another possible implementation of a satellite payload 70' for a system that employs GBBF. In this conventional implementation, groupings of N individual amplifiers are now replaced by an N-input×N-output HMA 72. In this implementation, elements of the HMA 72 (Input MPHM, N amplifiers, and the Output MPHM) are co-located on-board the satellite.

FIG. 6 depicts a representative 4×4 MPHM 600 showing a typical interconnection of individual hybrid couplers 610. It should be noted that other possible internal processing arrangements are possible. It should be further noted that lower or higher order implementations of MPHMs are possible. For example, 8-input×8-output MPHM arrangements may be employed.

FIG. 7 depicts an alternate 4×4 MPHM 600' commonly referred to as a Butler Matrix. The Butler Matrix 600' is similar in design to the MPHM 600 depicted in FIG. 6, with the exception that two 45° phase shifters 620 have been inserted on two of the internal signal paths between the left hand side (input) and right hand side (output) hybrid couplers 610.

FIG. 8 depicts an example of a full 4×4 HMA 800, along with internal interconnections. The HMA 800 includes an input MPHM 810 and an output MPHM 820 are depicted, along with 4 parallel amplifiers 830. This is a more detailed representation of the full HMA that is depicted in the satellite payload of FIG. 5.

SUMMARY OF THE INVENTION

According to some embodiments of the present invention, a satellite communications system includes a satellite configured to communicate with terminals, a station configured to communicate signals intended for the terminals to the satellite via a plurality of feeder links and a beamformer including an input multi-port hybrid matrix (MPHM) and a complementary output MPHM in a signal path with the plurality of feeder links. The output MPHM is positioned at the satellite and coupled to the input MPHM via the plurality of feeder links. For example, the input MPHM may be positioned at a ground-based satellite gateway. The input and output MPHMs may be configured to implement fully populated signal transformation matrices that collectively provide a substantially diagonal signal transformation matrix.

In additional embodiments, the system further includes a feeder link compensation unit in the signal path and a calibration unit configured to adjust the feeder link compensation unit responsive to feedback from a receiving station receiving a calibration signal injected into the signal path. The system may further include an antenna geometry compensation unit coupled to the input MPHM and a calibration unit configured to adjust the antenna geometry compensation unit responsive to feedback from a receiving station receiving a calibration signal injected into the signal path.

In further embodiments of the present invention, a communications satellite includes a feeder link antenna configured to receive signals from a station via a plurality of feeder links and a phased array antenna configured to communicate the received signals to terminals. The satellite further includes a processing unit coupled between the feeder link antenna and the phased array antenna and including an output MPHM configured to complement an input MPHM coupled to the satellite via the plurality of feeder links. In additional embodiments, an apparatus for supporting satellite communications between a satellite and terminals includes a feeder link antenna configured to communicate signals intended for the terminals to the satellite via a plurality of feeder links and a signal processing unit including an input MPHM configured to complement an output MPHM positioned at the satellite. In some method embodiments, beamforming for communications between a satellite and terminals use a hybrid matrix amplifier (HMA) including an output MPHM positioned at the satellite and a complementary input MPHM coupled to the output MPHM via the plurality of feeder links.

DETAILED DESCRIPTION OF EMBODIMENTS OF THE INVENTION

Figure 1:
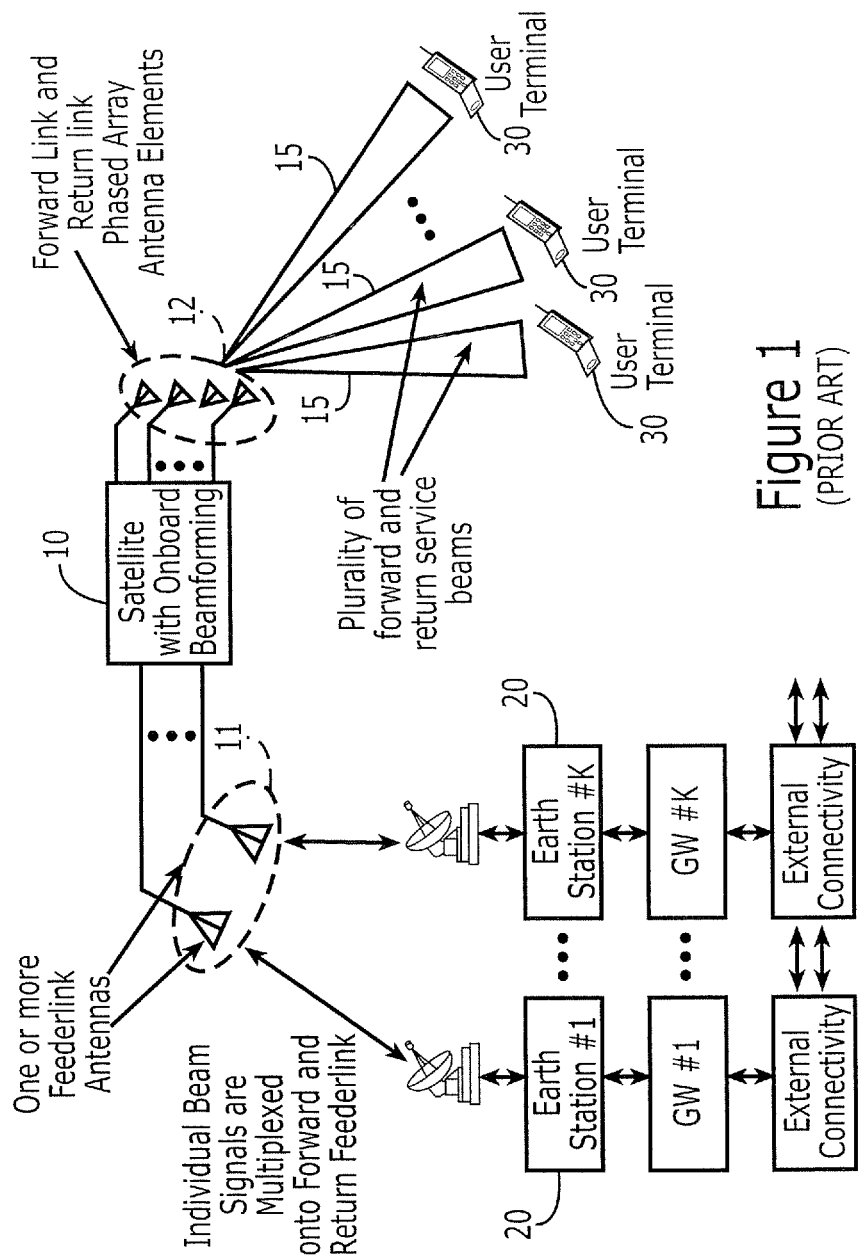
FIG. 1 illustrates a conventional satellite communications system using on-board beamforming.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

It should also be noted that in some alternate implementations, the functions/acts noted in the flowchart blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts may be separated into multiple blocks and/or the functionality of two or more blocks of the flowcharts may be at least partially integrated.

Figure 9:
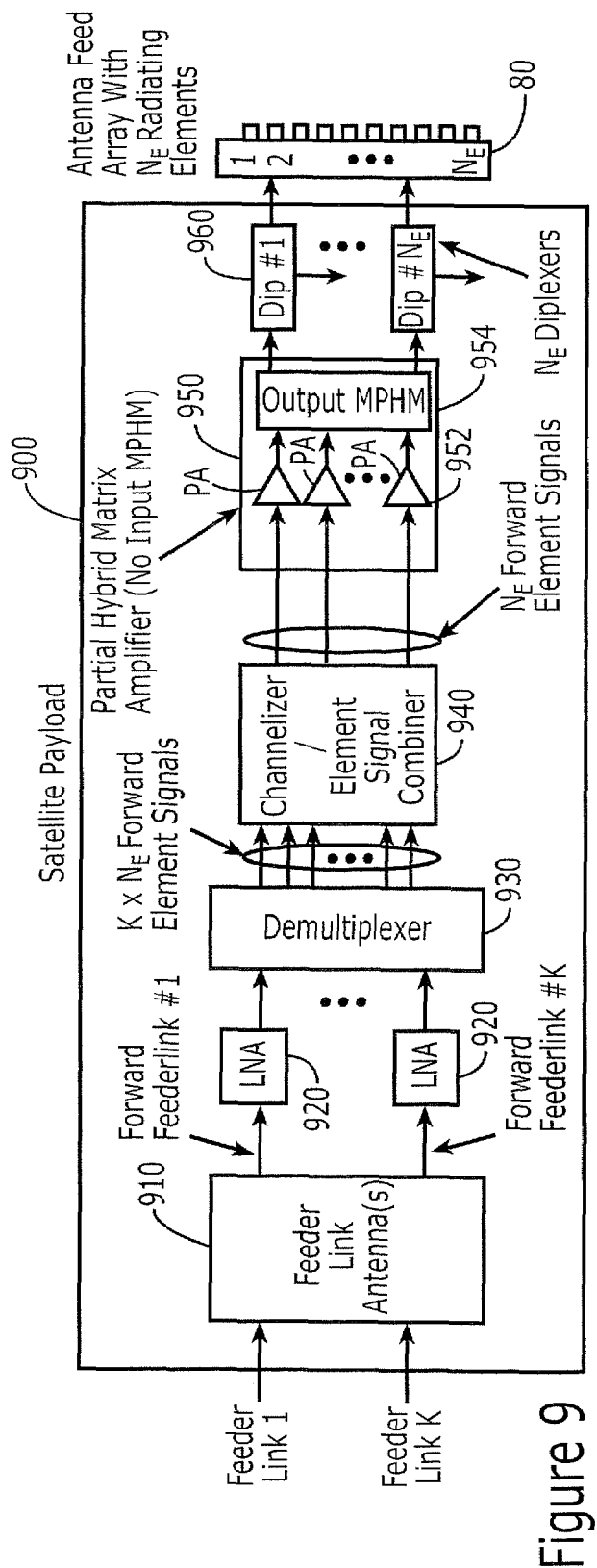
FIG. 9 illustrates a satellite payload with a partial HMA according to some embodiments of the present invention.

FIG. 9 depicts satellite payload processing according to some embodiments of the present invention. A satellite payload 900 includes feeder link antenna(s) 910, low noise amplifiers (LNAs) 920, a demultiplexer 930, a channel equalizer/element signal combiner 940, a partial HMA 950 and diplexers 960, which are coupled to an antenna feed array 80. The partial HMA 950 includes power amplifiers 952 and an output MPHM 954. In the illustrated embodiments, an input-MPHM has been omitted from the satellite payload 900, and the processing associated with an input MPHM is performed within a GBBF subsystem located at the satellite gateway.

Figure 10:
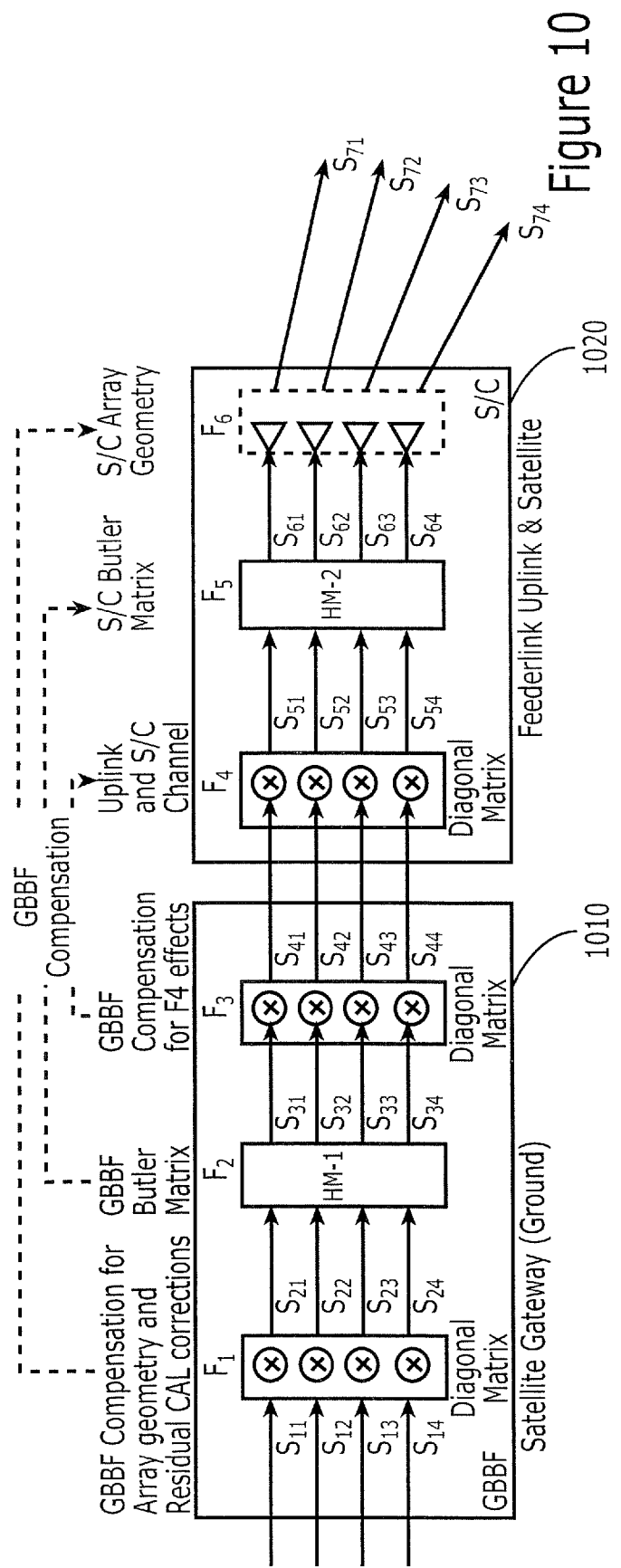
FIG. 10 illustrates beamforming compensation according to some embodiments of the present invention.

FIG. 10 depicts exemplary end-to-end GBBF calibration processing that is performed within a satellite gateway 1010 and a satellite payload 1020 in some embodiments of the present invention. The location of the inner hybrid-matrix calibration compensation processing is depicted by the $F_3$ block, and the outer calibration processing is depicted by $F_1$. Furthermore, the relative location of the Input MPHM denoted by $F_2$ is shown between the $F_1$ and $F_3$ calibration steps. Input MPHM $F_2$ is located within the communication satellite gateway 1010 and not within the satellite payload 1020. The output MPHM is denoted by $F_5$ Some embodiments of the present invention may arise from a realization that satellite weight and power may be a scarce resource and that, in certain applications, it may be desirable to relocate payload hardware from the satellite to the satellite gateway located on the ground when this can be performed without significantly impacting the overall system performance. Some embodiments of the present invention include techniques and methods for calibrating satellite beamforming systems that employ distributed MPHMs and also incorporate some of the beamforming signal processing within the satellite ground station (or gateway).

Some embodiments of the present invention address techniques to perform beamforming calibration of the forward link phased array signals used to generate forward link beams for systems incorporating distributed or partial HMAs. In some embodiments of the present invention, a two-stage calibration process may enable complete, end-to-end forward link calibration when there is not a one-to-mapping between the phased array antenna elements and the forward link beamforming component signals that are multiplexed onto the uplink feeder link. This later situation may be the case when the input MPHM is not co-located with the remaining elements of the HMA (that is, the input HMA is not located with the parallel amplifiers and Output MPHM onboard the satellite).

A satellite communication system which employs a phased array antenna on the satellite to produce multiple forward link service beams may require that an ensemble of signals with proper amplitude and phase weighting be generated and applied to the input side of each radiating element of the forward link phased array antenna. For purposes of the following discussion, the forward link is the signal path that is transmitted from the satellite earth station (or gateway) to the satellite, which is in turn transmitted by the satellite to the user terminal. In a typical conventional satellite system design, the required amplitude and phase weighting process is implemented onboard the satellite. For purposes of the following discussion, this approach shall be referred to as "onboard beamforming." FIG. 1 depicts a simplified view of a satellite communication system that employs onboard beamforming.

Figure 2:
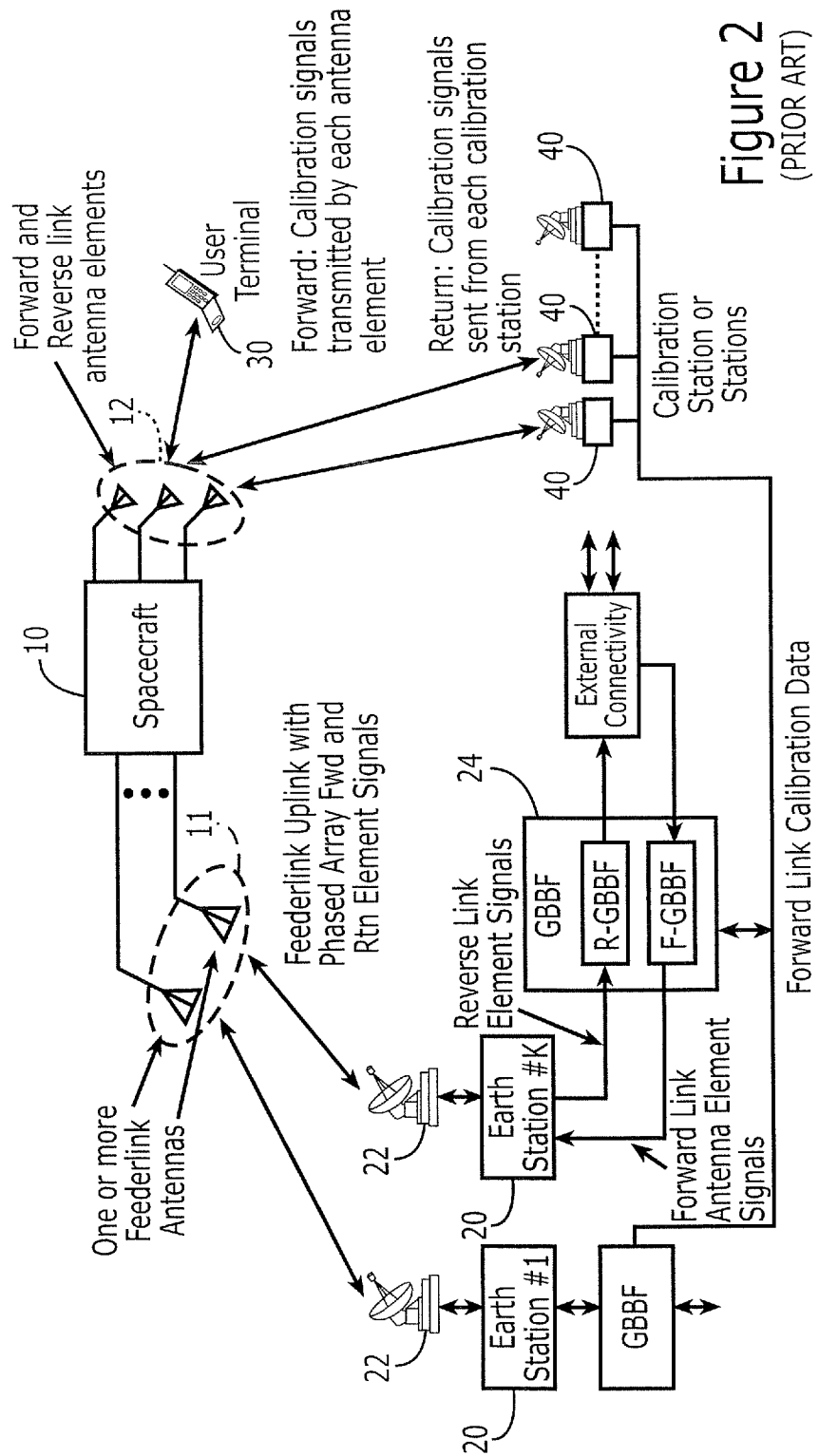
FIG. 2 illustrates a conventional satellite communications system using ground-based beamforming.
Figure 3:
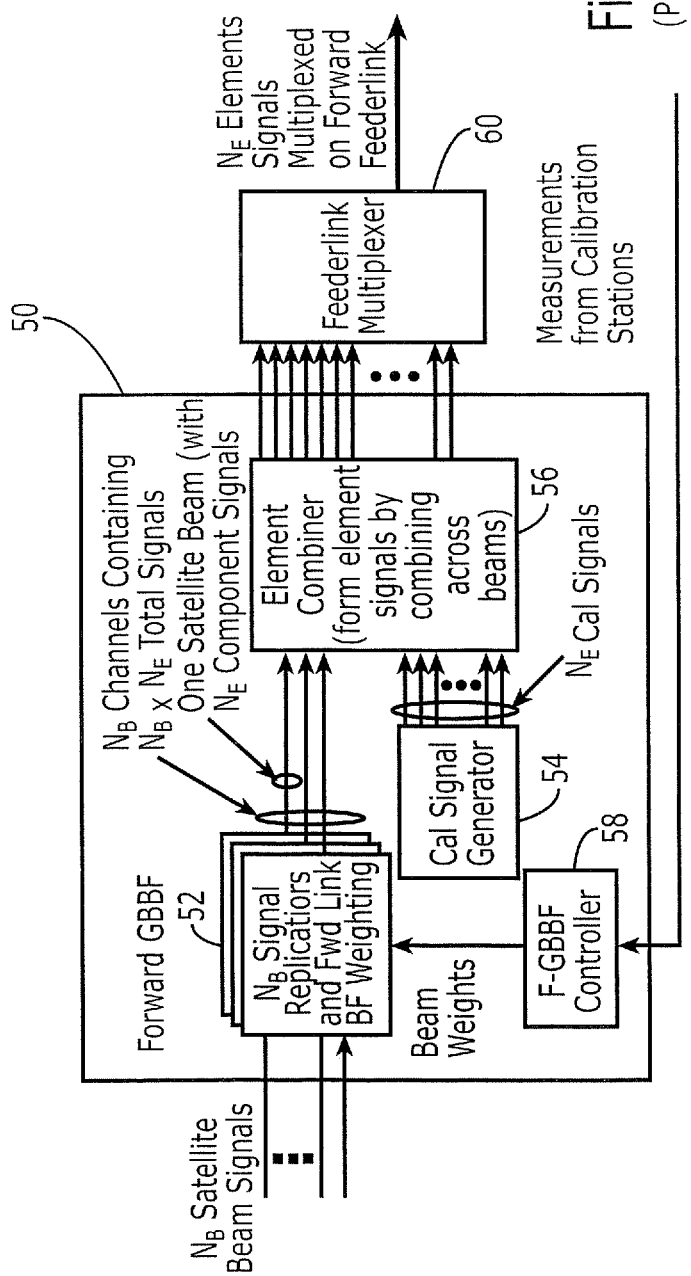
FIG. 3 illustrates a conventional ground-based beamformer.
Figure 4:
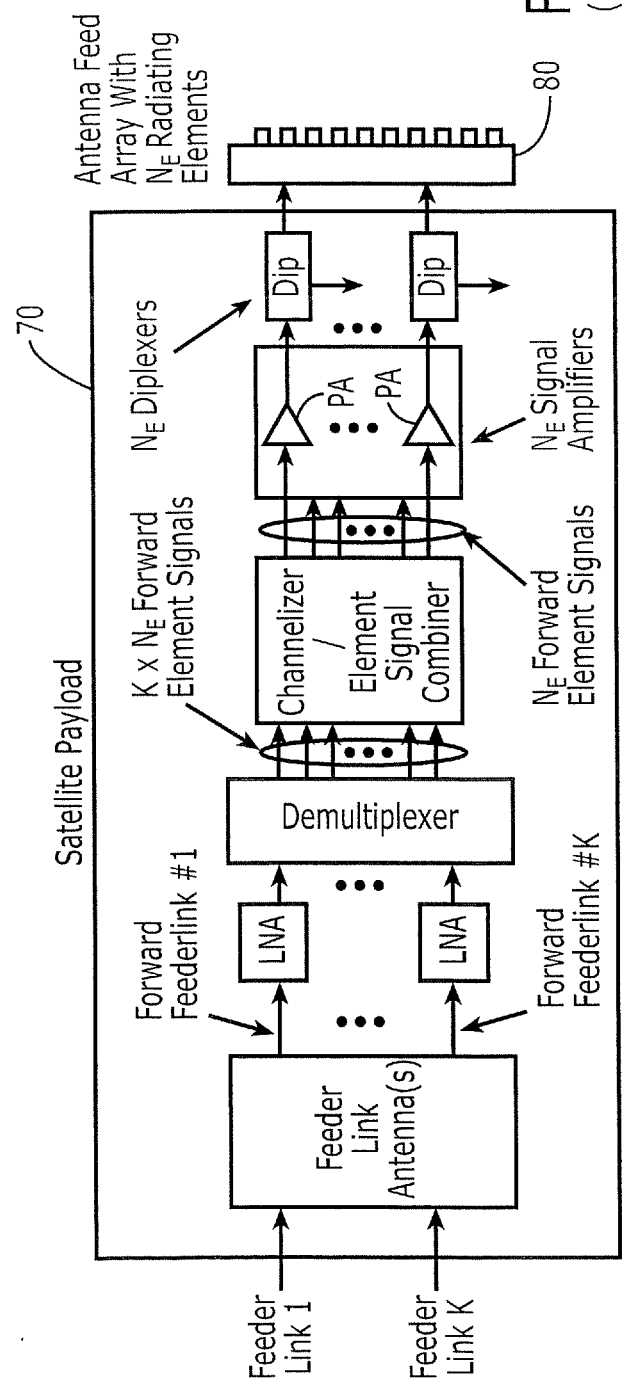
FIGS. 4 and 5 illustrate conventional satellite payloads for use with the ground-based beamformer of FIG. 3.
Figure 5:
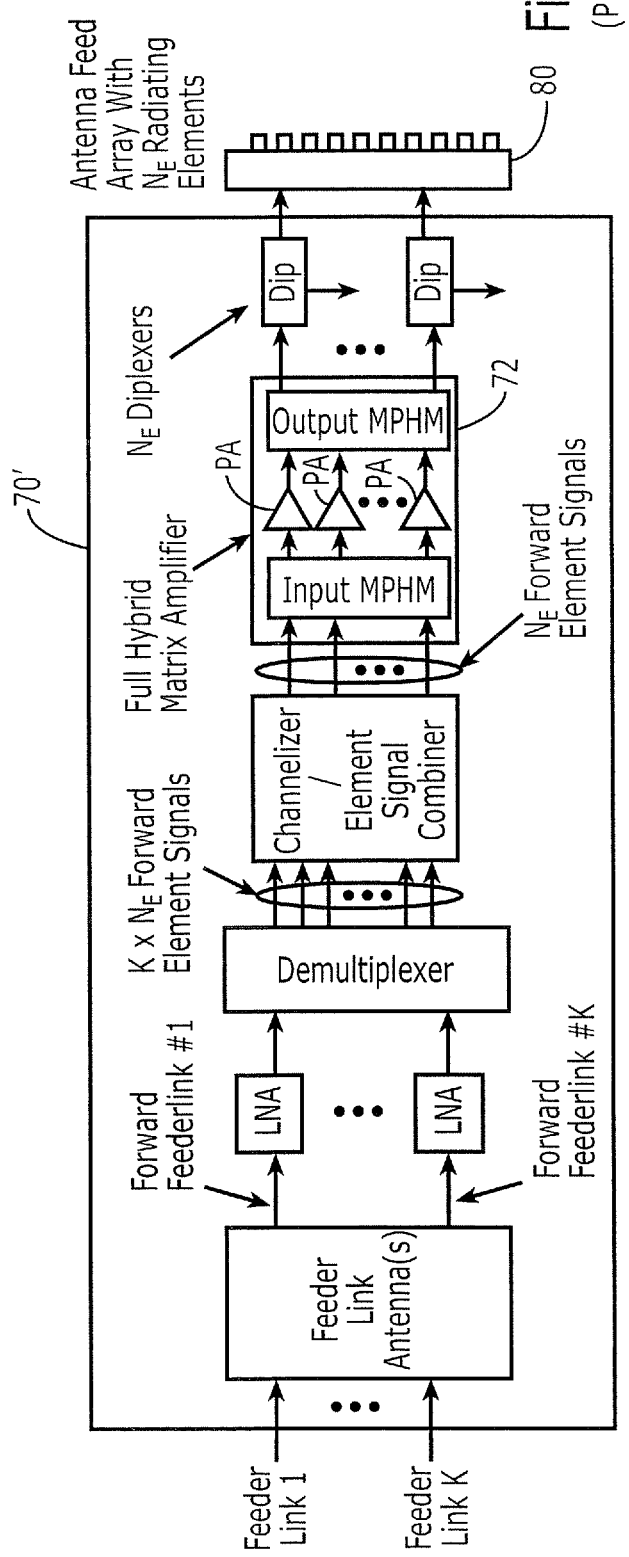

The generation of the individual forward link amplitude and phase weighted signals may be implemented apart from the satellite, e.g., at a ground site. In this case, the individually weighted, forward link antenna element signals are then transmitted to the satellite over the feeder link uplink. When this approach is employed, the individual element level signals may be multiplexed onto the satellite's forward feeder link by one of several possible means (for example, frequency division multiplexing or code division multiplexing). At the satellite, the individual forward link element signals may be demultiplexed from the feeder link, and the individual extracted signals may, after suitable pre-processing (for example, filtering and amplification by the satellite payload), be applied individually to the input of an appropriate phased array antenna element. For the purposes of the following discussion, this approach to beamforming shall be referred to as "ground based beamforming." FIG. 2 depicts one possible high-level implementation of a communication satellite system that employs ground-based beamforming (GBBF).

When ground based beamforming is employed in the forward link direction, the ground-based beamforming subsystem within the satellite gateway may generate an ensemble of individual element level signals for transmission to the individual phased array elements. When GBBF is used on the forward link, the amplitude and phase transfer characteristics of the entire forward path typically may be continuously, or nearly continuously, determined by signal-path measurements in order to derive the proper amplitude and phase weight/correction factors for each forward link to be formed by the satellite. These measurements may be based on observing the amplitude and phase of known-calibration signals that have been intentionally injected and transmitted by the system.

One design technique employed in multi-beam satellite systems is the use of hybrid matrix amplifiers to achieve a more uniform distribution of signal amplitudes across the ensemble of forward link amplifiers located onboard the satellite. A typical hybrid matrix amplifier is composed of appropriately interconnected input and output hybrid matrices, with power amplifiers located at an intermediate point between the input and output hybrid matrices, as is depicted in FIG. 9.

Figure 6:
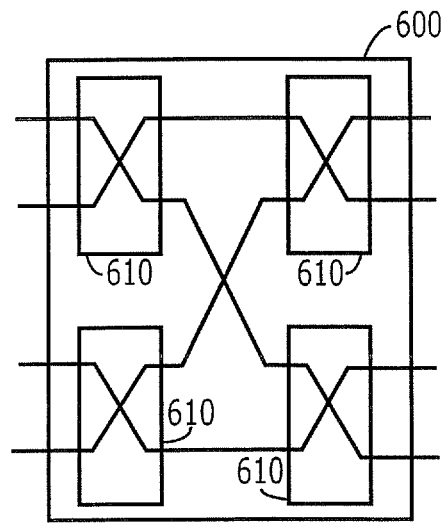
FIG. 6 illustrates a hybrid matrix.
Figure 7:
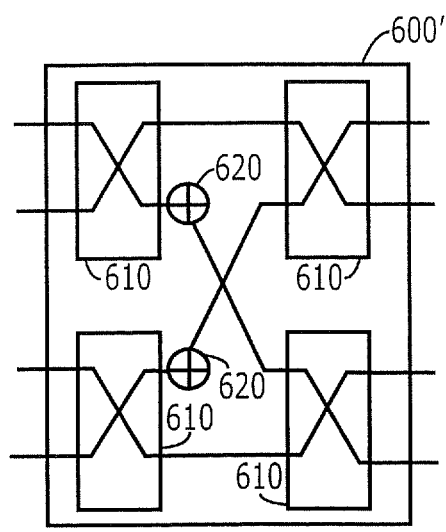
FIG. 7 illustrates a Butler matrix.
Figure 8:
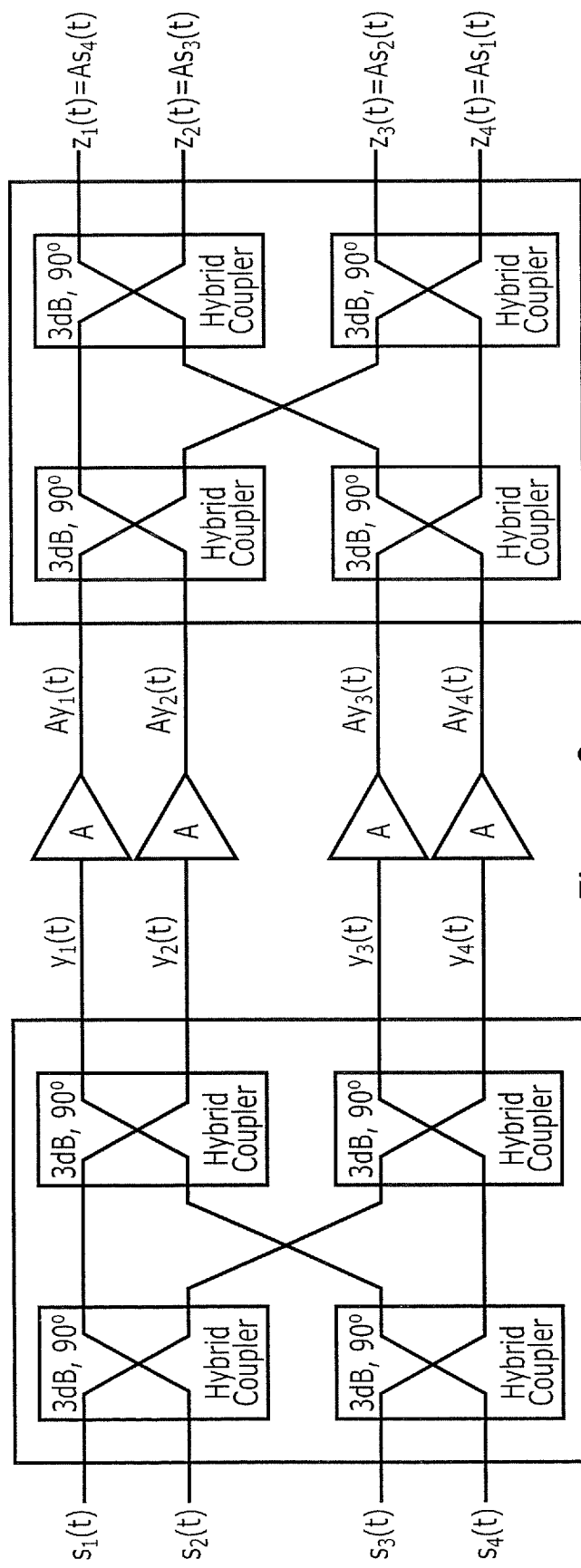
FIG. 8 illustrates a conventional hybrid matrix amplifier.

FIGS. 6 and 7 depict two possible implementations of an individual 4×4 hybrid matrix. A hybrid matrix may be composed of passive hybrid couplers and, optionally, additional inserted phase shift elements, which act to divide the input signals while simultaneously applying specific phase shift values to a subset of the intermediate, power-divided signals. The resulting intermediate signals may be combined or summed (internal to the MPHM) before being supplied to the N output terminals of the MPHM. It should be noted that the present invention is not limited to a specific MPHM design but, rather, may use any of a number of N-input by N-Output MPHMs.

Some embodiments of the present invention provide approaches for forward link calibration for satellite communication systems that employ a distributed HMA design. In particular, in some embodiments, a two-stage calibration process/system may be used wherein corrections for a subset of the end-to-end degradations are computed and applied in an outer calibration loop, and the compensation for the remaining degradations and/or transmission effects, are corrected/applied within an inner calibration loop. As discussed below, this two-step calibration process/system may provide proper operation of the distributed HMA and, consequently, may permit proper operation of the end-to-end beamforming operation.

FIG. 10 depicts an end-to-end calibration process/system, including both the inner and outer calibration processing, according to some embodiments of the present invention. For simplicity, this figure depicts an implementation for forward link design that employs 4-input by 4-output (denoted 4×4) MPHMs. However, the present invention is applicable to the more generalized case of an N-input by N-output MPHM. FIG. 10 depicts 28 individual time domain signals, denoted as $S_{ij}$ (where i=1, ... 7, and j=1, ... 4). More specifically, four signals are located at each of seven intermediate stages depicted by FIG. 10. These signals may be more generally represented as $S_{ij}(t)$, indicating the time-varying aspect of these signals. FIG. 10, also depicts a series of six signal transformations denoted by $F_k$ (where k=1, ... 6) that are applied to the ensemble of input signals ($S_{1j}$). Some of these transformations may be intentionally applied by the system, while others may be undesirable consequences of the transmission process (e.g., atmospheric degradations as the signals traverse the forward feeder link). In FIG. 10, the input MPHM is denoted by the block labeled HM-1, while the output MPHM is denoted by the block labeled HM-2. The input MPHM (HM-1) is located within the ground subsystem, while HM-2 is located within the satellite payload after the parallel amplifiers (as depicted in FIG. 10).

The first three signal transformations (specifically $F_1$, $F_2$, and $F_3$) are located within the F-GBBF processing subsystem located within the GBBF subsystem, which in turn is located within the satellite gateway, similar to the depiction of FIG. 2. The following discussion provides an overview of six signal transformations that may be applied to the signals as they traverse the forward link.

$F_1$: The $F_1$ signal transformation represents the calibration corrections applied by the gateway to the input signals ($S_{1j}$) to compensate for the phased array antenna's geometry, that is, for the geometrical spacing/layout of the forward link phased array antenna elements located onboard the satellite. In a conventional satellite system design (wherein both HM-1 and HM-2 are located onboard the satellite), the output signals from signal transformation $F_1$, specifically $S_{2j}$, j=1 . . . 4, might represent a one-to-one mapping with the antenna element signals generated by the satellite gateway which may, at this point in the GBBF processing, be fully pre-corrected in amplitude and phase so as to arrive at the inputs to the satellites phased array elements with the proper amplitude and phase to properly form the ensemble of forward link beams. Because the element weights are applied individually to each element, the $F_1$ signal transformation can be represented by a diagonal matrix operating on the input signals, wherein the N diagonal matrix elements are non-zero complex weights, and consist of both a differential amplitude and differential phase correction, while the off-diagonal elements are substantially equal to 0.

$F_2$: The $F_2$ signal transformation represents the input MPHM signal transformation, consisting of linear operations of signal splitting/division, signal phase rotation, and signal recombination of the resulting internal signals. In conventional implementations, this MPHM signal transformation may be performed onboard the communications satellite (within the HMA). In some embodiments of the present invention, this processing may be located within the satellite gateway. The exact form of the $F_2$ processing may be dependent on the processing/transformation implemented by HM-2 (that is, $F_5$). In general, the composite signal matrix/transformation operations of $F_2$ followed by $F_5$ may result in a diagonal signal transformation matrix (i.e., $F_2 \times F_5 = I_{N \times N}$, where $I_{N \times N}$ is the N×N identity matrix with all N diagonal elements equal to 1, and the twelve off-diagonal elements equal to 0). The $F_2$ transformation represents a fully populated matrix with all of the N×N elements represented by non-zero complex weights (with both amplitude and phase components).

$F_3$: The $F_3$ signal transformation represents signal processing circuitry which, according to some embodiments of the present invention, provides compensation for the effects of $F_4$. In some embodiments of the present invention, where HM-1 is located in the satellite gateway, the $F_3$ compensation may be applied at the satellite gateway to linear transformations of the phased array antenna elements (this linear transformation/combination may result from the application of $F_2$ to the antenna element signals), as opposed to being applied as a one-to-one transformation when HM-1 is located onboard the satellite. An aspect of the present invention is that the $F_3$ signal transformation may be computed and implemented before the normal GBBF amplitude and phase corrections (that is, the $F_1$ transformation) can be computed and applied within the outer calibration loop. Calibration signals are summed with the individual output signals from the $F_3$ transformation, and these signals are multiplexed (for example, frequency-division multiplexed or code-division multiplexed) onto the feeder link uplink for transmission to the satellite. The $F_3$ signal transformation can be represented by a diagonal matrix operating on the input signals, wherein the N diagonal matrix elements are non-zero complex weights, and include both a differential amplitude and differential phase correction, while the off-diagonal elements are substantially equal to 0.

$F_4$: The $F_4$ signal transformation represents a composite amplitude and phase transfer function of the feeder link transmission process, including: multiplexing of element signals onto the feeder link, uplink atmospheric effects, satellite de-multiplexing, and additionally, the satellite processing performed up to the satellite's parallel HMA amplifiers (up to the input side of the Output MPHM). Since the atmospheric effects are generally time varying, and given that the payload path-to-path variations may similarly be time varying (though normally at a significantly slower rate than the atmospheric effects), the overall $F_4$ transformation is represented as a time-varying signal transformation. Absent any mutually coupling or crosstalk within the payload, the $F_4$ transformation may operate on both the desired input signals ($S_4$), and the new hybrid-matrix calibration signals ($S^*_4$). The $F_4$ transformation can be represented by a diagonal matrix wherein the N diagonal matrix elements are non-zero complex weights, and includes both a differential amplitude and differential phase connection, while the off-diagonal elements are all substantially equal to 0.

$F_5$: The $F_5$ signal transformation may be implemented onboard the satellite and represents signal phasing and signal addition performed by the Output MPHM (or HM-2) located on the output side of the satellite's parallel amplifiers. As was the case for the $F_2$ transformation (i.e., HM-1), the $F_5$ transformation may be characterized by a fully populated matrix with all of the N×N elements represented by non-zero complex weights (with both amplitude and phase components). An idealized implementation of HM-2 may provide substantially identical gain levels across all N×N input/output paths, and phase shifts corresponding to multiples of $2\pi \times (K/L)$, where both K and L are integers (whose values are dependent on the specific design of MPHM employed). The $F_5$ transformation represents a fully populated matrix with all of the N×N elements represented by non-zero complex weights (with both amplitude and phase components). In practice, imperfections in the components and fabrication of the MPHM may result in non-equal gains across the N×N combinations of input output paths, and may produce variations in the phase input output transfer function from that defined above.

$F_6$: The $F_6$ signal transformation represents variations in phase and amplitude resulting from the signal pathways and couplings between the output ports of the Output MPHM (HM-2) and the input feeds to the phased-array antenna elements and, furthermore, represents the additional atmospheric effects experienced/imposed during transmission to the ground (specifically to the earth-based calibration stations).

In the discussion that follows, techniques for determining the amplitude and phase corrections to be implemented by the $F_3$ transformation will be referred to as Hybrid Matrix Calibration (or HM-Cal). A process of determining the amplitude and phase corrections to be implemented by the $F_1$ transformation will be referred to as Beamforming Calibration (or BF-Cal). One aspect of some embodiments of the present invention is the inclusion of nested calibration processes, e.g., an inner HM-Cal process followed by an BF-Cal process. The differential amplitude and phase changes imposed by $F_4$ may be corrected before BF-Cal. Some embodiments of the present invention provide background and processes for performing this inner HM-Cal process.

A goal of HM-Cal may be to derive the correction weights for the $F_3$ transformation to pre-compensate for the effects of $F_4$. That is, when the $F_3$ weights are properly calculated and implemented, the resulting signals applied to the input of the satellite's HMA HM-2 may have substantially the same (relative) amplitude and phase relationship as the signals appearing at the output of the $F_2$ transformation, that is, $F_3 \times F_4 = \gamma \cdot I_{N \times N}$ (where γ is a real-valued, constant scaler). As each of the components of these N×N signal transformations is time varying, both $F_3$ and $F_4$ are time-varying transformations.

When the $F_3$ complex weights are implemented correctly, the input signals to $F_5$ (that is, the signal vector $S_5$, composed of the elements $S5_j$, where j=1, . . . N), may have substantially the same relative phase and relative amplitude relationship as the elements of the $S_3$ signal vector ($S3_j$, j=1 . . . N). Under this assumption, the signal vector $S_6$ at the output of the HM-2 transformation may be related to the vector $S_2$ by a constant amplitude scaling, and a multiple of 2π in phase—both of which may be irrelevant to the final beamforming process. That is, when the inner HM-Cal process is correctly implemented, the net effect of the composite signal transformation between the input of HM-1 (at the gateway) and the output of HM-2 (onboard the satellite) can be approximately represented by the N×N Identity transformation with a constant scaling (i.e., $F_2 \times F_3 \times F_4 \times F_5 = \gamma \cdot I_{N \times N}$). In particular, the $F_3$ signal transformation may be employed to cancel out the frequency-dependent effects of $F_4$ (that is, $F_3 \times F_4 = \gamma \cdot I_{N \times N}$).

When the (inner) $F_3$ calibration/transformation process is correctly implemented, the resulting effects of composite signal transformation between the HM-1 transformation to the HM-2 transformation may be to recreate the original signal vector $S_2$ substantially unaltered (with the possible exception of a constant amplitude scaling and composite phase shift represented by $k*2\pi$, where k is an integer). That is, $F_2 \times (F_3 \times F_4) \times F_5 = F_2 \times (\gamma \cdot I_{N \times N}) \times F_5 = F_2 \times F_5 = \gamma \cdot I_{N \times N}$.

When the inner cal processing is correctly performed, the outer BF-Cal calibration process may be implemented in a conventional manner through the action of the $F_1$ complex signal weights. That is, the outer BF-Cal process can be implemented as if the Input MPHM was located onboard the satellite.

The discussion that follows addresses the implementation of the inner HM-Cal process, and does not specifically address the outer (BF-Cal) calibration process/transformation, as these processes can be decoupled when the HM-Cal process is appropriately implemented.

Figure 11:
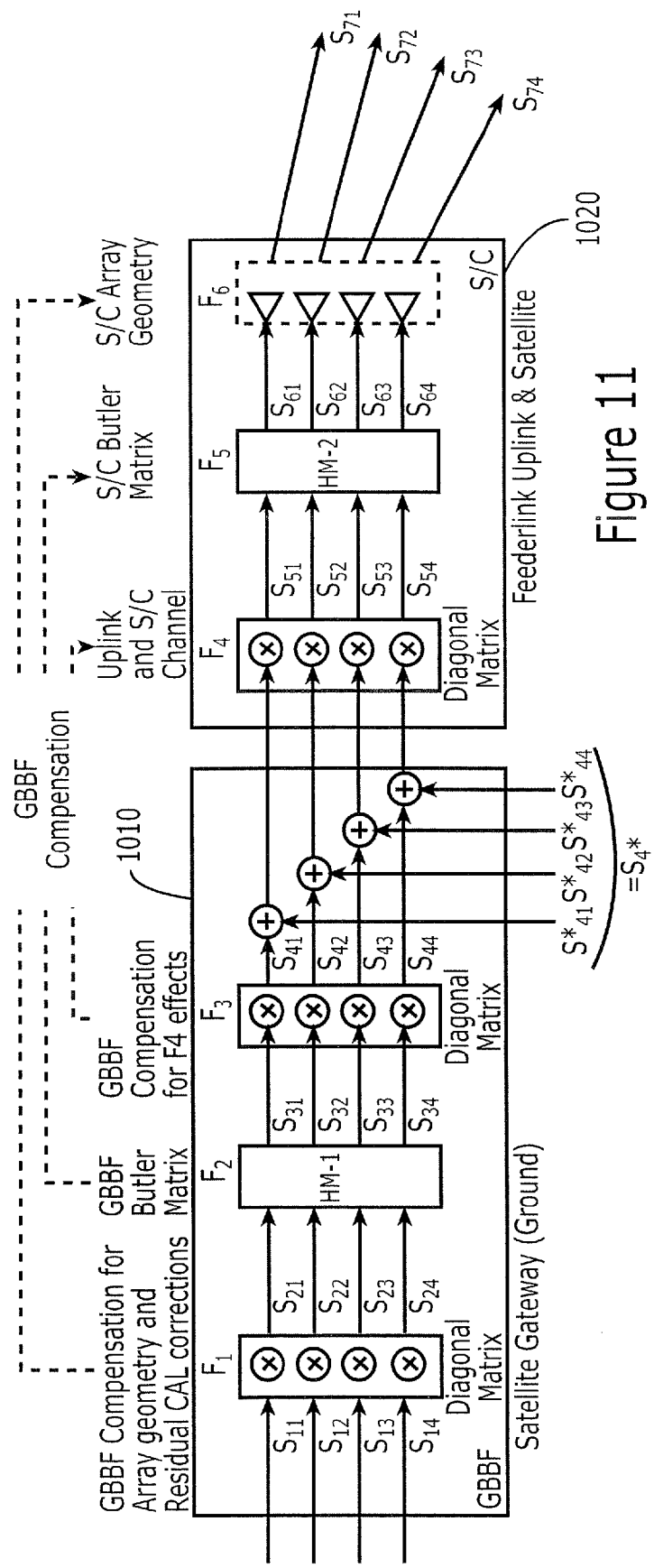
FIG. 11 illustrates beamforming compensation with calibration therefor according to some embodiments of the present invention.

In order to perform HM-Cal, some embodiments of the present invention employ forward link calibration signals that are injected after the $F_3$ signal transformations (within the satellite gateway), and which are superimposed directly onto the output of the $F_3$ transformation. Insertion of the HM-Cal signals is shown in FIG. 11. In this implementation, the normal communication signals traverse the full signal path from $F_1$ to $F_6$. The forward link calibration signals that are injected after the $F_3$ signal transformation and superimposed with the weighted user signals are denoted $S^*_{4j}$ (where j=1, . . . N). These calibration signals are not subjected to the phase rotations and splitting/recombining operation(s) that are performed within the HM-1 multi-port hybrid matrix. In order to permit proper processing of these ($(S^*_4)$) calibration signals, the individual components include orthogonal signals. That is, $S^*_{4i}$ is orthogonal to $S^*_{4j}$ when i≠j. There are many signal sets that may be used to achieve said orthogonality (e.g., Walsh codes).

Without loss of generality, for the purposes of the following discussion, it is assumed that N=4 in the following discussion, that is, the MPHM includes four input and 4 output ports, and the signal transformation operations are representable as 4×4 complex matrix transformations. It should be understood that this does not limit the applicability of the present invention to more generalized N×N embodiments.

Under the above assumption, the output of the $F_4$ signal transformation ($S_5$) can then be represented as follows:

$$\begin{bmatrix} S_{51} \\ S_{52} \\ S_{53} \\ S_{54} \end{bmatrix} = \begin{bmatrix} F_{4_{11}} & 0 & 0 & 0 \\ 0 & F_{4_{22}} & 0 & 0 \\ 0 & 0 & F_{4_{33}} & 0 \\ 0 & 0 & 0 & F_{4_{44}} \end{bmatrix} \times \begin{bmatrix} S_{41} + S^*_{41} \\ S_{42} + S^*_{42} \\ S_{43} + S^*_{43} \\ S_{44} + S^*_{44} \end{bmatrix}$$

Or, alternatively, the output of the $F_4$ signal transformation can be decomposed into a "user signal component," and a "calibration signal component" as:

$$\begin{bmatrix} S_{51} \\ S_{52} \\ S_{53} \\ S_{54} \end{bmatrix} = \begin{bmatrix} F_{4_{11}} & 0 & 0 & 0 \\ 0 & F_{4_{22}} & 0 & 0 \\ 0 & 0 & F_{4_{33}} & 0 \\ 0 & 0 & 0 & F_{4_{44}} \end{bmatrix} \times \begin{bmatrix} S_{41} \\ S_{42} \\ S_{43} \\ S_{44} \end{bmatrix} +$$

$$\begin{bmatrix} F_{4_{11}} & 0 & 0 & 0 \\ 0 & F_{4_{22}} & 0 & 0 \\ 0 & 0 & F_{4_{33}} & 0 \\ 0 & 0 & 0 & F_{4_{44}} \end{bmatrix} \times \begin{bmatrix} S^*_{41} \\ S^*_{42} \\ S^*_{43} \\ S^*_{44} \end{bmatrix}$$

or, more simply as:

$$S_5 = F_4 \times S_4 + F_4 \times S^*_4$$

The $F_5$ transformation (i.e., HM-2) that is performed onboard the satellite may power divide, re-phase, and sum both the user signal components and the calibration signal components. When the inner calibration process (that is, HM-Cal) is correctly performed, the $F_5$ transformation that is applied to the user component signals may invert the operation of the $F_2 \times F_3 \times F_4$ transformation. However, since the HM-Cal signals do not traverse either the $F_2$ or $F_3$ transformation, the $F_5$ transformation may re-phase, power divide, and superimpose the calibration component signals across all of the associated phased-array antenna elements. The exact signal phasing and the polarities of the superposition process performed by HM-2 may be dependent on the implementation of the HMA.

With regard to the HM-Cal component signals, the output signal from phased array element number one can be written as:

$$S^*_{7_1} = [F_{6_{11}} * F_{5_{11}} * F_{4_{11}}] \times S^*_{4_1} + [F_{6_{11}} * F_{5_{12}} * F_{4_{22}}] \times$$
$$S^*_{4_2} + [F_{6_{11}} * F_{5_{13}} * F_{4_{33}}] \times S^*_{4_3} + [F_{6_{11}} * F_{5_{14}} * F_{4_{44}}] \times S^*_{4_4}$$

If the phased array antenna is designed in such a way that the spatial coverage areas of the co-MPHMs elements do not overlap, calibration stations may be located so as to have visibility to the $S^*_{7_1}$ signal component, while simultaneously having limited or no visibility to the remaining elements of the $S^*_7$ signal vector (that is, $S_{7_2}$, $S_{7_3}$ and $S_{7_4}$). In order to simplify the notation that follows, and referring to the above equation, the above coefficients of the $S_4$ elements may be denoted as follows:

$$S^*_{7_1} = (S_{7_1}^{41} \times S^*_{4_1}) + (S_{7_1}^{42} \times S^*_{4_2}) + (S_{7_1}^{43} \times S^*_{4_3}) + (S_{7_1}^{44} \times S^*_{4_4})$$

where, $S_{7_1}^{41} = [F_{6_{11}} * F_{5_{11}} * F_{4_{11}}]$,
$S_{7_1}^{42} = [F_{6_{11}} * F_{5_{12}} * F_{4_{22}}]$,
$S_{7_1}^{43} = [F_{6_{11}} * F_{5_{13}} * F_{4_{33}}]$,
$S_{7_1}^{44} = [F_{6_{11}} * F_{5_{14}} * F_{4_{44}}]$.

One goal of a HM-Cal process according to some embodiments of the present invention is to derive the complex, time-varying weights of the $F_4$ signal transformation. Once these are known, a proper inversion operation can be derived and implemented within the $F_3$ transformation at the satellite gateway.

Recall that the HM-Cal calibration signals $S^*_4$ have been chosen so as to be orthogonal over a suitable integration period, that is:

$$\langle S^*_{4_i}, S^*_{4_j} \rangle = \begin{cases} 1, & i = j \\ 0, & i \neq j \end{cases}$$

It can be seen that each of the above four complex weights/signals can therefore be determined by performing suitable correlation operations on the signal observed at the earth calibration station from phased array element number one. For example, $$\langle S^*_{7_1}, S^*_{4_1} \rangle = \langle \{[F_{6_{11}} * F_{5_{11}} * F_{4_{11}}] \times S^*_{4_1} + [F_{6_{11}} * F_{5_{12}} * F_{4_{22}}] \times S^*_{4_2} +$$
$$[F_{6_{11}} * F_{5_{13}} * F_{4_{33}}] \times S^*_{4_3} + [F_{6_{11}} * F_{5_{14}} * F_{4_{44}}] \times S^*_{4_4}\}, S^*_{4_1} \rangle$$
$$= \langle [F_{6_{11}} * F_{5_{11}} * F_{4_{11}}] \times S^*_{4_1}, S^*_{4_1} \rangle +$$
$$\langle [F_{6_{11}} * F_{5_{12}} * F_{4_{22}}] \times S^*_{4_2}, S^*_{4_1} \rangle + \langle [F_{6_{11}} * F_{5_{13}} * F_{4_{33}}] \times S^*_{4_3}, S^*_{4_1} \rangle + \langle [F_{6_{11}} * F_{5_{14}} * F_{4_{44}}] \times S^*_{4_4}, S^*_{4_1} \rangle$$

Assuming that the signal set $S^*_4$ is chosen appropriately so that the correlation period over which the signals are orthogonal is short in comparison to the time-variations in the $F_4$ processes (which are composed of both atmospheric effects imposed on the feeder link uplink and, additionally, variations that occur in the payload processing prior to the parallel amplifiers in the HMA), then the above can be simplified to:

$$\langle S^*_{7_1}, S^*_{4_1} \rangle = [F_{6_{11}} * F_{5_{11}} * F_{4_{11}}] *$$
$$\langle S^*_{4_1}, S^*_{4_1} \rangle + [F_{6_{11}} * F_{5_{12}} * F_{4_{22}}] * \langle S^*_{4_2}, S^*_{4_1} \rangle + [F_{6_{11}} * F_{5_{13}} * F_{4_{33}}] *$$
$$\langle S^*_{4_3}, S^*_{4_1} \rangle + [F_{6_{11}} * F_{5_{14}} * F_{4_{44}}] * \langle S^*_{4_4}, S^*_{4_1} \rangle$$

Owing to the orthogonality of the HM-Cal signals, and assuming that the set $S^*_4$ has been suitably normalized such that $\langle S^*_{4_1}, S^*_{4_1} \rangle = 1$, the above simplifies to:

$$\langle S^*_{7_1}, S^*_{4_1} \rangle = [F_{6_{11}} * F_{5_{11}} * F_{4_{11}}] * \langle S^*_{4_1}, S^*_{4_1} \rangle + 0 + 0 + 0$$
$$= [F_{6_{11}} * F_{5_{11}} * F_{4_{11}}]$$

Given the above, each of the individual complex weights preceding the set $\{S_{7_1}^{4i}, i=1, \ldots 4\}$ can be observed and isolated at the appropriate calibration station by applying a suitable cross-correlation signal processing operation to the aggregate signal received from each of the phased array elements.

It may be noted that each of the complex weights $\{S_{7_1}^{4i}, i=1, \ldots 4\}$ represents the product of three individual complex terms, with one term from each of the $F_4$, $F_5$ and $F_6$ transformations. That is:

$$S_{7_1}^{4i} = [F_{6_{11}} * F_{5_{1i}} * F_{4_{ii}}]; \text{ for } i=1, \ldots 4$$

It may be noted that two of the three complex weight terms are known a priori to the HM-Cal process. That is, the complex term from the $F_5$ transformation may be a known function of the MPHM design (and can be further characterized post-manufacturing), and the complex term from the $F_6$ transformation may be known via ground-based test/characterization and through measurement performed within the outer BF-Cal calibration process.

Consequently, each of the individual complex weights/elements from the set $\{F_{4_{ij}}; \text{ for } i=1, \ldots 4, \text{ and } j=1, \ldots 4\}$ can be determined through suitable measurements made at the calibration earth station, and after appropriate post-processing, as defined above.

The above calibration-station processing operations may be predicated on a phased array design that properly isolates the antenna patterns of each of the radiating elements that are common to a single Output MPHM.

The calibration earth station can use the measured carrier phase of the first complex, time varying coefficient/term $S_{7_1}^{4_1}$ to track and measure the differential phase of the remaining set of complex coefficients/terms $\{S_{7_1}^{4i}, i=2, \ldots 4\}$. Denote the differential/relative phases between the first complex weight $S_{7_1}^{4_1}$ and the remaining set of complex weights $\{S_{7_1}^{4i}, i=2, \ldots 4\}$ as $\Delta\phi(1,j)$ (for $j=2, \ldots 4$). Furthermore, let $\Delta\theta(1,k)$ (where $k=2, \ldots 4$) represent the differential phasing imposed on the remaining complex terms $\{S_{7_1}^{4i}, i=2, \ldots 4\}$ by the $F_4$ transformation. The phase relationship between the $\Delta\phi(1,j)$ and $\Delta\theta(1,k)$ terms can be written as:

$$\Delta\phi(1,2) = \Delta\theta(1,2) + \{\forall[F_{5_{11}}] - \forall[F_{5_{12}}]\}$$

$$\Delta\phi(1,3) = \Delta\theta(1,3) + \{\forall[F_{5_{11}}] - \forall[F_{5_{13}}]\}$$

$$\Delta\phi(1,4) = \Delta\theta(1,4) + \{\forall[F_{5_{11}}] - \forall[F_{5_{14}}]\}$$

It can be seen that the terms on the right hand side (above) are strictly functions of the signal phasing and summing that occurs within the Output MPHM that is implemented onboard the satellite and, furthermore, the values of these terms may be known a priori to the calibration earth station. For the following discussion, denote these (MPHM design dependent) terms as follows:

$$\forall HM_2(1,2) = \{\forall[F_{5_{11}}] - \forall[F_{5_{12}}]\}$$

$$\forall HM_2(1,4) = \{\forall[F_{5_{11}}] - \forall[F_{5_{13}}]\}$$

$$\forall HM_2(1,4) = \{\forall[F_{5_{11}}] - \forall[F_{5_{14}}]\}$$

It may be noted that the above terms provide the relative phase differentials between the MPHM, and not the absolute phase values. However, the relative phases may be sufficient for the purpose of performing the HM-Cal operation. In order to provide the appropriate amplitude corrections to compensate for non-uniform amplitude response between the output of the $F_3$ transformation and the input to the $F_4$ transformation, define the set of real-valued amplitude weights $\{\alpha_i; i=1, \ldots 4\}$ as follows:

$$\alpha_i = |F_{5_{11}}|/|S_{7_1}^{4i}|.$$

The HM-Cal process according to some embodiments of the invention further involves specifying/setting the complex valued correction weights to be applied within the $F_3$ transformation using the derived phase and amplitude factors previously computed. These complex gain corrections may be specified as follows:

$$F_3 = \begin{bmatrix} F_{3_{11}} & 0 & 0 & 0 \\ 0 & F_{3_{22}} & 0 & 0 \\ 0 & 0 & F_{3_{33}} & 0 \\ 0 & 0 & 0 & F_{3_{44}} \end{bmatrix}$$
$$= \begin{bmatrix} \alpha_1 & 0 & 0 & 0 \\ 0 & \alpha_2 e^{j\Delta\theta(1,2)} & 0 & 0 \\ 0 & 0 & \alpha_3 e^{j\Delta\theta(1,3)} & 0 \\ 0 & 0 & 0 & \alpha_4 e^{j\Delta\theta(1,4)} \end{bmatrix}$$

With the above implementation, the calibration of each Output MPHM may require measurements and processing at (only) one earth calibration station. The calibration earth station may be located such that it is within the primary footprint of one (and only one) of the phased-array antenna elements associated with the Output MPHM. However, calibration of an entire suite of MPHMs may require more than one calibration earth station. Regardless, the processes identified above may be used at one or more than one calibration earth station, as required by the specific satellite communication system design.

FIG. 11 depicts insertion of calibration signals $S_4^*$ after the $F_3$ signal transformation at a satellite gateway 1010 according to some embodiments of the present invention. These new calibration signals may enable the inner calibration processing used to compensate for path degradations present between the output ports of the Input MPHM $F_2$ and input ports of the Output MPHM $F_5$.

Figure 12:
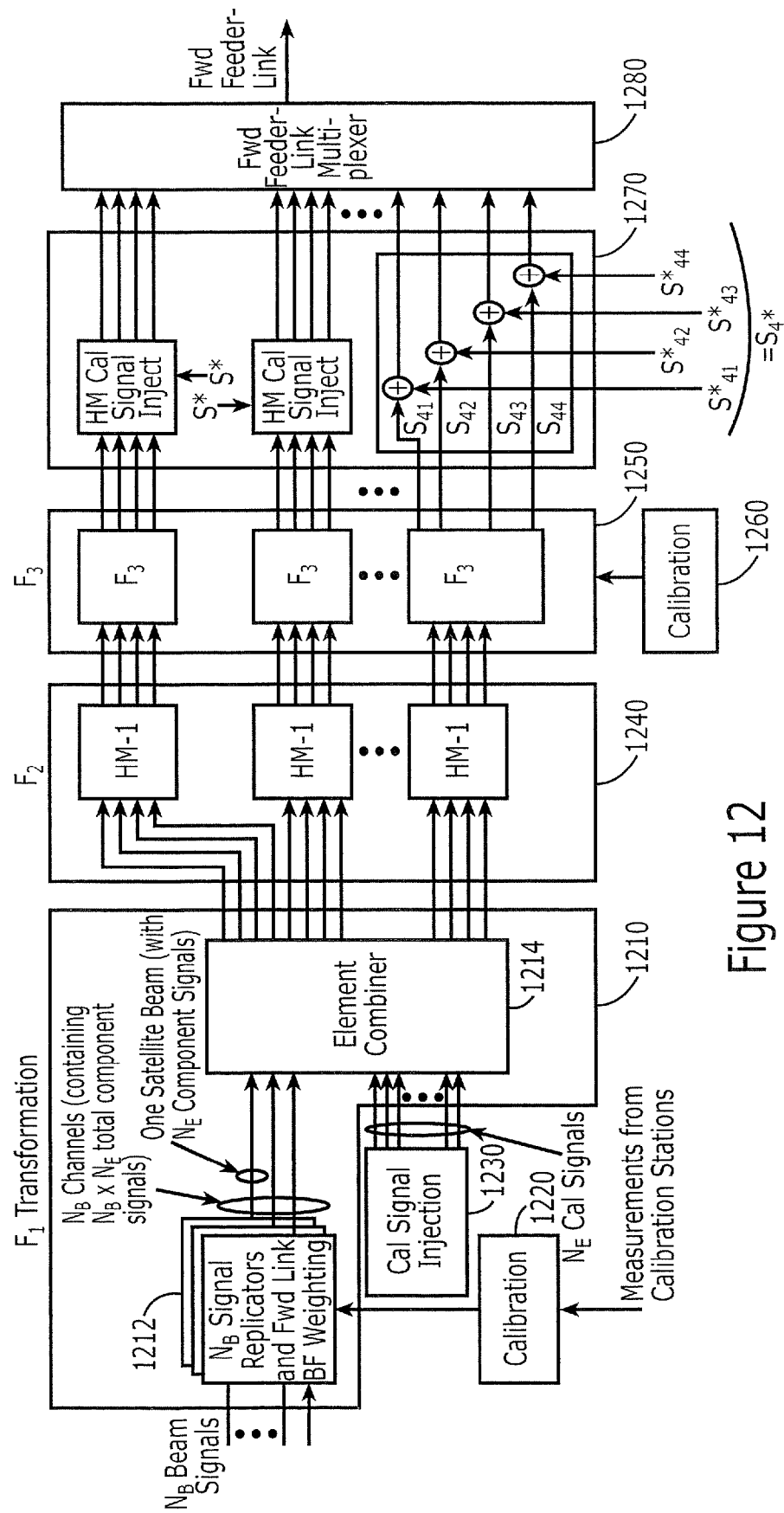
FIG. 12 illustrates ground-based beamforming infrastructure according to further embodiments of the present invention.

FIG. 12 depicts end-to-end signal processing according to some embodiments of the present invention, including both an outer calibration loop and an inner calibration loop. Ground-based infrastructure 1200 for use with complementary satellite based infrastructure, such as the payload shown in FIG. 9, includes a beamforming compensation unit 1210, a beamforming calibration unit 1220, a beamforming calibration signal injection unit 1230, an input MPHM unit 1240, a hybrid matrix compensation unit 1250, a hybrid matrix calibration unit 1260, a hybrid matrix calibration signal injection unit 1270, and a feeder link multiplexer 1260. As illustrated, the beamforming compensation unit 1210 includes a signal replication and forward link weighting unit 1212 which receives $N_B$ beam signals and produces $N_B$ channels therefrom including appropriately weighted $N_E$ components. These channels are provided to an element combiner unit 1214, which combines the signals to produce appropriate inputs to MPHMs in the input MPHM unit 1240. The combiner unit 1214 includes calibration signals injected by the calibration signal injection unit 1230. Weightings applied by the signal replication and weighting unit 1212 are adjusted by the calibration unit 1220, which acts responsive to measurements of the injected calibration signals received from calibration stations.

This diagram depicts multiple parallel processing branches which implement the inner (HMA) calibration processing, using one N-input×N-output branch. Each individual N-path branch corresponds to a single N-path Output MPHM located within the satellite payload. Some embodiments of the present invention relate to satellite communication systems utilizing a plurality of forward link beams which are generated by one or more phased array antennas located on the satellite and which utilize a distributed hybrid matrix amplifier (HMA) configuration, as described below and depicted in FIGS. 9 (satellite payload) and 10 (satellite gateway). Conventional use of HMAs within satellite communication systems typically incorporates the entire HMA (specifically, the N×N input MPHM, N parallel amplifiers, and the N×N output MPHM) within the satellite payload. In some embodiments of the present invention, an input MPHM is not located onboard the satellite, but rather, is located on the ground within the satellite gateway, more specifically within the forward link GBBF subsystem. There are various reasons to implement such a satellite design including a desire to reduce satellite power and weight requirements and to improve overall satellite payload reliability.

Figure 13:
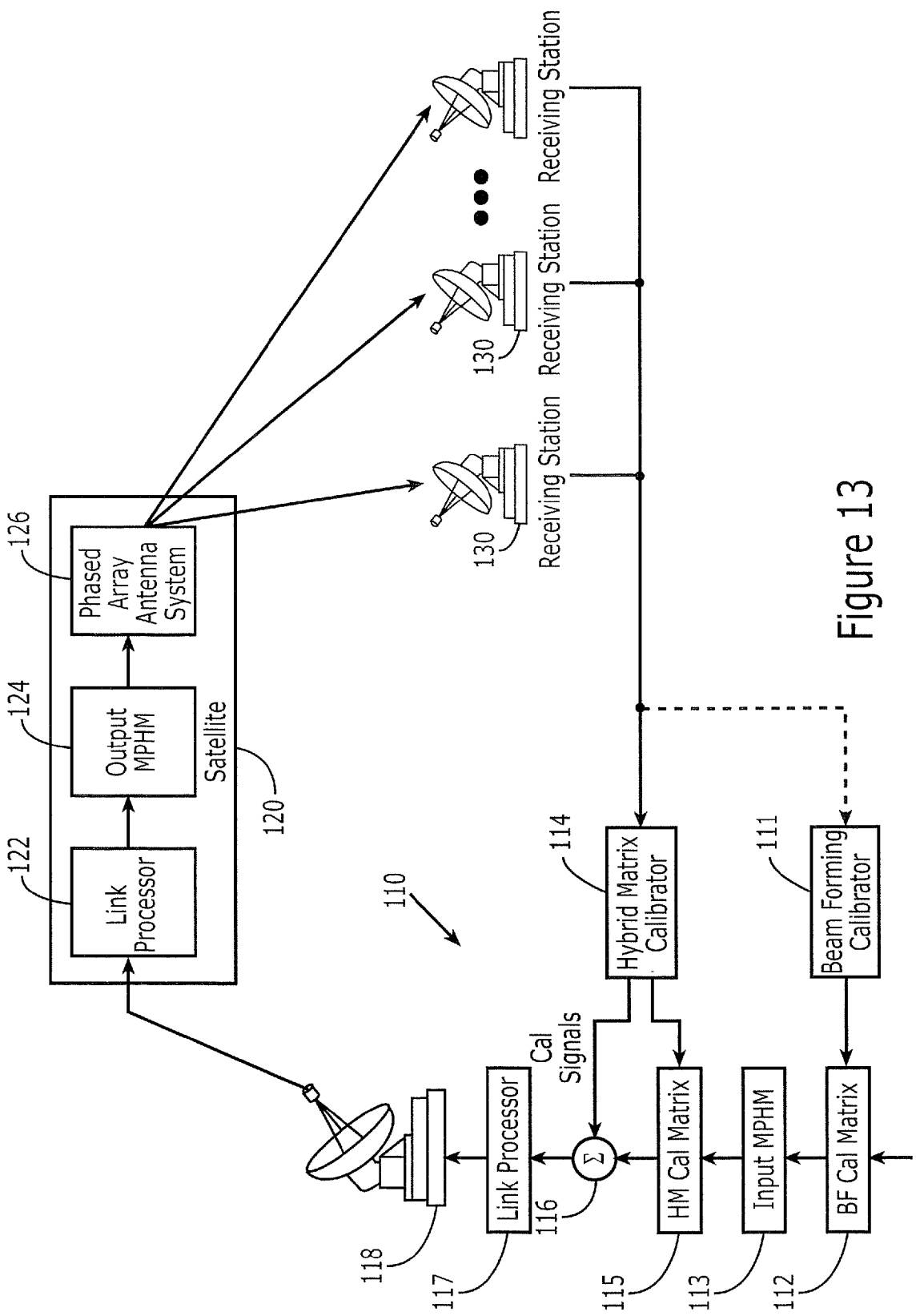
FIG. 13 illustrates a satellite communications system incorporating distributed beamforming according to further embodiments of the present invention.

FIG. 13 illustrates satellite communications systems and methods according to further embodiments of the present invention. A satellite 120 includes link processor circuitry 122, e.g., circuitry configured to receive, demultiplex and perform other processing on feeder link signals received from a ground based feeder link antenna 118. The link processor 122 provides signals to circuitry 124 that implements an output multi-port hybrid matrix, e.g., circuitry that performs signal phasing and signal addition operations as described above to signals to be applied to the feed elements of a phased array antenna system 120 that forms beams for transmission.

Ground-based infrastructure 110 supports a feeder link to the satellite 120 via the antenna 118. The ground-based infrastructure 110 includes circuitry that implements a beamforming calibrator 111, which controls parameters of a beamforming calibration matrix 112, e.g., circuitry that supports an outer beamforming calibration process along lines discussed above. The ground-based infrastructure 110 also includes circuitry that implements an input multi-port hybrid matrix 113, e.g., circuitry configured to perform linear operations of signal splitting/division, signal phase rotation, and signal recombination of the resulting internal signals. The ground-based infrastructure 110 further includes circuitry that implements a hybrid matrix calibrator 114 that controls parameters of a hybrid matrix calibration matrix 115. In particular, along lines discussed above, the hybrid matrix calibrator 114 may be configured to inject calibration signals at signal injection point 116 downstream of the hybrid matrix calibration matrix 115. The calibration signals are conveyed through the satellite 120 and one or more receiving stations 130 back to hybrid matrix calibrator 114, which responsively adjusts parameters of the hybrid matrix calibration matrix 115.

It will be appreciated that components of the ground-based infrastructure 110 may be collocated (e.g., at the site of the feeder link antenna 118) or may be distributed at a plurality of locations. In general, the ground-based infrastructure 110 may be implemented using analog hardware, digital hardware (including software-controlled data processing hardware) and combinations thereof. For example, the calibration matrices 112, 115 may be implemented using any of a number of different types of digital signal processing circuitry, including digital signal processors (DSPs), gate arrays, and the like. As shown, in FIG. 13, the beamforming calibrator 111 and the hybrid matrix calibrator 114 may operate responsive to the same receiving stations 130, or may use different sets of receiving stations.

In summary, in some embodiments of the present invention, hybrid matrix functions are distributed across ground and space-based infrastructure. Some embodiments of the present invention provide techniques for calibrating satellite communications systems that employ phased array antennas to produce multiple space-to-earth antenna beams. More specifically, calibration techniques according to some embodiments of the present invention relate to satellite communication systems that include a distributed hybrid matrix amplifier wherein the Input Multi-port Hybrid Matrix is not located within the satellite payload (co-located with the Output Multi-port Hybrid Matrix, as is typically the case), but rather, is incorporated into a point earlier in the forward link signaling chain within the ground/satellite gateway. Some embodiments of the present invention provide techniques for calibrating the signal path between the output side of the Input MPHM (located at the satellite GW) and the input side of the Output MPHM (located onboard the satellite).

The foregoing discussion of a 4×4 HMA design does not limit the applicability of embodiments of the present invention to more generalized N×N HMA designs. Rather, the present invention is applicable to satellite systems that employ more generalized N×N HMAs.

In the drawings and specification, there have been disclosed exemplary embodiments of the invention. Although specific terms are employed, they are used in a generic and descriptive sense only and not for purposes of limitation, the scope of the invention being defined by the following claims.

What is claimed:

1. A satellite communications system comprising:
a satellite configured to communicate with terminals;
a station configured to communicate signals intended for the terminals to the satellite via a plurality of feeder links; and
a beamformer comprising an input multi-port hybrid matrix (MPHM) and a complementary output MPHM in a signal path with the plurality of feeder links, the output MPHM positioned at the satellite and coupled to the input MPHM via the plurality of feeder links.

2. The system of claim 1, wherein the input and output MPHMs implement fully populated signal transformation matrices that collectively provide a substantially diagonal signal transformation matrix.

3. The system of claim 1, wherein the satellite comprises a partial hybrid matrix amplifier (HMA) comprising the output MPHM and a plurality of amplifiers coupled to respective input ports thereof.

4. The system of claim 1, further comprising:
a feeder link compensation unit in the signal path; and
a calibration unit configured to adjust the feeder link compensation unit responsive to feedback from a receiving station receiving a calibration signal injected into the signal path.

5. The system of claim 4, further comprising a calibration signal injection unit configured to inject the calibration signal into the signal path on an input MPHM side of the feeder links.

6. The system of claim 4, further comprising the receiving station.

7. The system of claim 4, where the calibration unit comprises a first calibration unit and wherein the system further comprises:
an antenna geometry compensation unit coupled to the input MPHM; and
a second calibration unit configured to adjust the antenna geometry compensation unit responsive to feedback from a receiving station receiving a calibration signal injected into the signal path.

8. The system of claim 7, further comprising a calibration signal injection unit configured to inject the calibration signal into the signal path on an input MPHM side of the feeder links.

9. The system of claim 7, further comprising the receiving station.

10. The system of claim 1, wherein the input and output MPHMs comprise respective Butler matrices.

11. The system of claim 1, wherein the input MPHM is positioned at a ground-based satellite gateway.

12. A communications satellite comprising:
a feeder link antenna configured to receive signals from a station via a plurality of feeder links;
a phased array antenna configured to communicate the received signals to terminals; and
a processing unit coupled between the feeder link antenna and the phased array antenna and comprising an output MPHM configured to complement an input MPHM coupled to the satellite via the plurality of feeder links.

13. The satellite of claim 12, wherein the input and output MPHMs implement fully populated signal transformation matrices and provide a composite effect substantially corresponding to a diagonal signal transformation matrix.

14. The satellite of claim 12, wherein the processing unit comprises a partial hybrid matrix amplifier (HMA) comprising the output MPHM and a plurality of power amplifiers coupled to respective input ports thereof.

15. The satellite of claim 14, wherein the processing unit further comprises:
a plurality of low noise amplifiers (LNAs) having inputs coupled to respective elements of the feeder link antenna;
a demultiplexer having inputs coupled to outputs of the LNAs;
a channelizer/element signal combiner having inputs coupled to outputs of the demultiplexer and outputs coupled to inputs of the power amplifiers; and
a plurality of diplexers coupling respective outputs of the output MPHM to respective elements of the phased array antenna.

16. The satellite of claim 12, wherein the output MPHM comprises a Butler matrix.

17. An apparatus for supporting satellite communications between a satellite and terminals, the apparatus comprising:
a feeder link antenna configured to communicate signals intended for the terminals to the satellite via a plurality of feeder links; and
a signal processing unit comprising an input multi-port hybrid matrix (MPHM) configured to complement an output MPHM positioned at the satellite.

18. The apparatus of claim 17, wherein the input and output MPHMs implement fully populated signal transformation matrices and provide a composite effect substantially corresponding to a diagonal signal transformation matrix.

19. The apparatus of claim 17, wherein the signal processing unit further comprises a feeder link compensation unit in a signal path of the input MPHM, the output MPHM and the intervening feeder links and wherein the apparatus further comprises a calibration unit configured to adjust the feeder link compensation unit responsive to feedback from a receiving station receiving a calibration signal injected into the signal path.

20. The apparatus of claim 19, wherein the signal processing unit further comprises a calibration signal injection unit configured to inject the calibration signal into the signal path on an input MPHM side of the feeder links.

21. The apparatus of claim 19, where the calibration unit comprises a first calibration unit, wherein the signal processing unit further comprises an antenna geometry compensation unit in the signal path and wherein the apparatus further comprises a second calibration unit configured to adjust the antenna geometry compensation unit responsive to feedback from a receiving station receiving a calibration signal injected into the signal path.

22. The apparatus of claim 21, further comprising a calibration signal injection unit configured to inject the calibration signal into the signal path on an input MPHM side of the feeder links.

23. The apparatus of claim 17, wherein the input MPHM comprises a Butler matrix.

24. The apparatus of claim 17 positioned at a ground-based satellite gateway.

25. A method of operating a satellite communications system comprising a satellite configured to communicate with terminals and a station configured to communicate signals intended for the terminals to the satellite via a plurality of feeder links, the method comprising:

beam forming for communications between the satellite and terminals using an HMA including an output MPHM positioned at the satellite and a complementary input MPHM coupled to the output MPHM via the plurality of feeder links.

26. The method of claim 25, wherein the input and output MPHMs implement fully populated signal transformation matrices that collectively provide a substantially diagonal signal transformation matrix.

27. The method of claim 25, further comprising adjusting a feeder link compensation unit in a signal path of the HMA responsive to feedback from a receiving station receiving a calibration signal injected into the signal path.

28. The method of claim 27, further comprising adjusting an antenna geometry compensation unit coupled to the input MPHM responsive to feedback from a receiving station receiving a calibration signal injected into the signal path.

29. The method of claim 25, where the input and output MPHMs comprise respective Butler matrices.

30. The method of claim 25, wherein the input MPHM is positioned at a ground-based satellite gateway.

* * * * *

UNITED STATES PATENT AND TRADEMARK OFFICE
CERTIFICATE OF CORRECTION

PATENT NO. : 9,014,619 B2  Page 1 of 1
APPLICATION NO. : 11/751701
DATED : April 21, 2015
INVENTOR(S) : Benjamin et al.

It is certified that error appears in the above-identified patent and that said Letters Patent is hereby corrected as shown below:

In the Specification

Column 10, Line 8: Please correct "phase connection," to read -- phase correction, --

Column 14, Line 35: Please correct " $\forall H M_2(1,4)=$ " to read -- $\forall H M_2(1,3)=$ --

Signed and Sealed this
Twenty-second Day of December, 2015

Michelle K. Lee
*Director of the United States Patent and Trademark Office*